US010015015B1

(12) United States Patent
Lazar et al.

(10) Patent No.: US 10,015,015 B1
(45) Date of Patent: Jul. 3, 2018

(54) METHOD AND APPARATUS FOR VERIFYING SYSTEM LOG INTEGRITY

(71) Applicant: EMC Corporation, Hopkinton, MA (US)

(72) Inventors: Gregory W. Lazar, Upon, MA (US); Peter Puhov, Shrewsbury, MA (US); Millard C. Taylor, III, Chapel Hill, NC (US); Naizhong Chiu, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/503,319

(22) Filed: Sep. 30, 2014

(51) Int. Cl.
*H04L 9/32* (2006.01)
*G06F 21/55* (2013.01)

(52) U.S. Cl.
CPC .......... *H04L 9/3247* (2013.01); *H04L 9/3223* (2013.01); *G06F 21/552* (2013.01); *H04L 2209/24* (2013.01); *H04L 2209/72* (2013.01)

(58) Field of Classification Search
CPC ... H04L 9/3236; G06F 21/33; G06F 12/1408; G06F 21/6209
USPC ........................................................ 713/193
See application file for complete search history.

(56) References Cited

U.S. PATENT DOCUMENTS

| | | | | |
|---|---|---|---|---|
| 6,192,130 B1 * | 2/2001 | Otway | ............... | G06Q 20/3672 380/1 |
| 6,728,879 B1 * | 4/2004 | Atkinson | ............... | G06Q 30/06 707/999.202 |
| 7,073,071 B1 * | 7/2006 | Ellison | ............... | H04L 9/3236 713/193 |
| 8,195,959 B2 * | 6/2012 | Eldridge | ............... | G06F 21/33 380/286 |
| 2002/0038429 A1 * | 3/2002 | Smeets | ............... | G06F 12/1408 713/193 |
| 2003/0046238 A1 * | 3/2003 | Nonaka | ............... | G06F 21/10 705/51 |
| 2004/0171540 A1 * | 9/2004 | Webster | ............... | C07H 21/04 435/69.1 |
| 2005/0234909 A1 * | 10/2005 | Bade | ............... | G06F 21/552 |
| 2007/0074047 A1 * | 3/2007 | Metzger | ............... | H04L 9/0891 713/193 |
| 2013/0198521 A1 * | 8/2013 | Wu | ............... | G06F 21/6209 713/175 |

(Continued)

*Primary Examiner* — Eleni A Shiferaw
*Assistant Examiner* — Bryan Wright
(74) *Attorney, Agent, or Firm* — Krishnendu Gupta; John Hurley; Anne-Marie Dinius

(57) ABSTRACT

The techniques presented herein provide for verifying the integrity of an encryption key log file generated on a data storage system. Encryption key activity events associated with a storage system's back-end storage drives are identified. A unique signature is generated for each encryption key activity event. Each encryption key activity event and its corresponding signature are stored in an audit log file. An audit log hash file is generated using the contents of the audit log file. At an external location, the audit log file and the audit log hash file are retrieved from the storage system. The integrity of the retrieved audit log file is verified by generating a local audit log hash file and comparing the local audit log hash file to the retrieved audit log hash file and determining if the local audit log hash file matches the retrieved audit log hash file.

20 Claims, 5 Drawing Sheets

(56) References Cited

U.S. PATENT DOCUMENTS

2015/0188715 A1\* 7/2015 Castellucci ........... H04L 9/3265
713/178

\* cited by examiner

METHOD AND APPARATUS FOR VERIFYING SYSTEM LOG INTEGRITY

RELATED APPLICATIONS

This application is related to U.S. patent application Ser. No. 14/503,331, entitled "ASSOCIATING A DATA ENCRYPTION LOCKBOX BACKUP WITH A COMPUTER SYSTEM," filed concurrently herewith on Sep. 30, 2014, which is incorporated herein by reference in its entirety.

BACKGROUND

Technical Field

This application relates generally to verifying the integrity of a system log file.

Description of Related Art

Protecting confidential data (such as medical records, financial records, personal data, social security numbers, credit card numbers, corporate records, intellectual property, etc.) and other sensitive information from theft and/or unauthorized access is becoming increasingly important to businesses, computer users, and government organizations. Confidential data can exist as so-called "data-at-rest", which is data stored on some type of a storage system such as an array or tape), as well as "data in flight," (also referred to as "data in motion" or "data in transit") which includes data as it exists during its transmission or that is temporarily residing in computer memory to be read or updated).

In recent years there have been numerous examples of security breaches involving thefts of both data-at-rest and data in motion from tens of millions of users. Information technology (IT) professionals use various methods to help prevent such data theft. Currently, different techniques are used to protect data in motion as compared with protection of data at rest. For example, secure sockets layers (SSL), virtual private networks (VPNs) and combinations of these are two examples of security technologies that can be fairly effective in protecting and securing data in flight, especially when combined with other methods that protect that data from start to finish, such as message level security and application level security. Data at rest, however, requires different types of protection. Because of data mobility, data storage consolidation, and data replication, a single breach into data at rest can compromise many millions more records than with a single breach of data in flight.

Organizations have many options for securing data-at-rest, including authentication controls, logical separation, physical security, and encryption of information. Although each option has advantages and disadvantages, when extremely large amounts of data are involved, encryption can provide the most workable solution. Encryption of data, as is well known, involves converting data to an unintelligible form called ciphertext, which cannot be read unless a key is used to decrypt the data (in some types of encryption the same key also is used to encrypt the data). Encryption also can be an important way to protect data at rest in other situations, including the electronic and physical movement of data for backup, data recovery, and/or maintenance. In addition, encryption helps to limit exposure to security breaches, so even if someone is able to access the storage media, the data is still protected to prevent unauthorized access to sensitive information on the storage media. Use of encryption also helps address compliance with industry regulations that require encryption, such as the payment card industry Data Security Standard (PCI/DSS), the Sarbanes-Oxley Act, the Gramm-Leach Bliley Act (GLBA), the Health Insurance Portability and Accountability Act (HIPAA), the United Kingdom Data Protection act (UK DPA), the European Union Directive on personal information, (95/46/EC,), various state statutes protecting personal information such as California's CA 1798, and the like.

The security provided by any data encryption technology is as good as the encryption credentials used to encrypt the data. If the encryption key is not securely managed the data is at risk of being compromised. Losing or corrupting the key will lead to disastrous consequences resulting in a data unavailable/data loss scenario. Hence it is vitally important to securely store the keys while making them highly available when needed.

Organizations have sometimes been reluctant to deploy conventional encryption of data at rest for various reasons. Some reasons include the complexity of managing many keys, the need to add extra steps to existing processes for data storage (which can be difficult and time consuming, especially if existing management scripts for replication need to be modified), the expense, the time, and (for some implementations), the need to add one or more appliances to a network. Other issues with deployment of encryption include management complexity (the cost and complexity associated with deploying and managing multiple encryption technologies and key manager); scalability across an enterprise (many "point" solutions for encryption do not scale across application types or infrastructure elements) and disruption to service levels (installing encryption technologies and appliances may require a network outage and/or reconfiguration).

SUMMARY OF THE INVENTION

The techniques presented herein provide for verifying the integrity of an encryption key log file generated on a data storage system. Encryption key activity events associated with a storage system's back-end storage drives are identified. A unique signature is generated for each encryption key activity event. Each encryption key activity event and its corresponding signature are stored in an audit log file. An audit log hash file is generated using the contents of the audit log file. At an external location, the audit log file and the audit log hash file are retrieved from the storage system. The integrity of the retrieved audit log file is verified by generating a local audit log hash file and comparing the local audit log hash file to the retrieved audit log hash file and determining if the local audit log hash file matches the retrieved audit log hash file.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
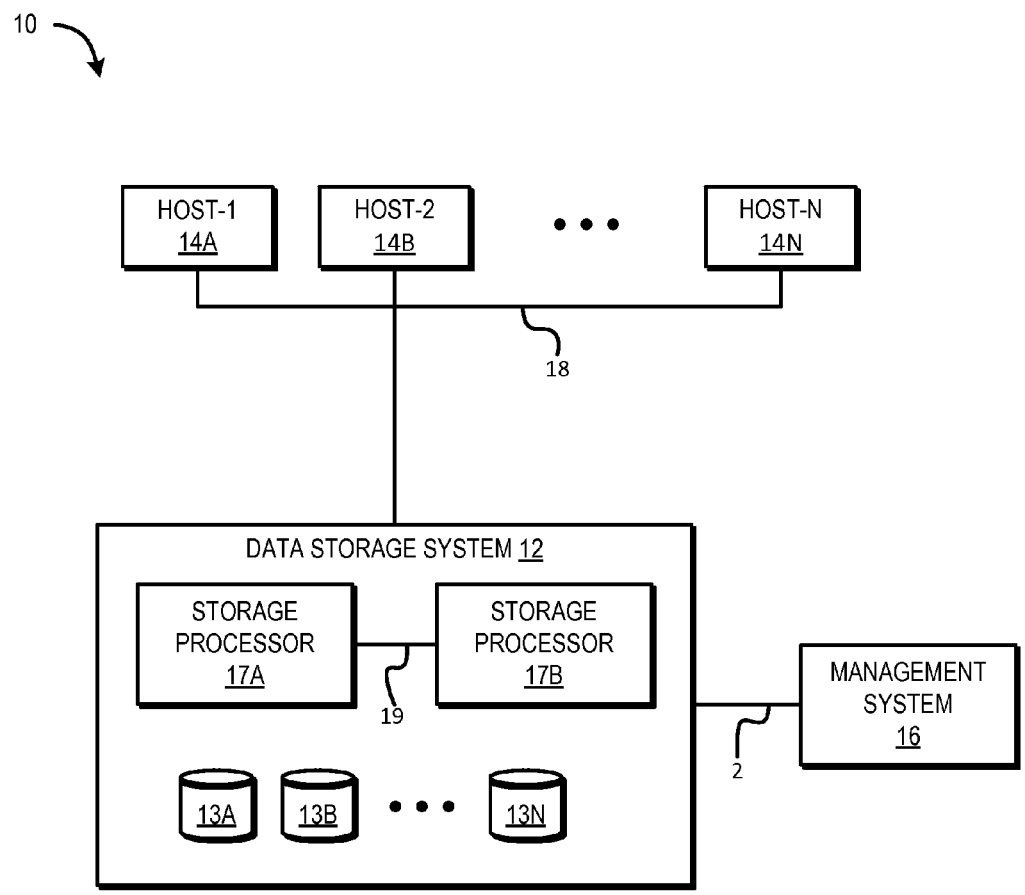
FIG. 1 is an example embodiment of a system that may utilize the techniques described herein.

System logs can be used to determine when particular events occur in a system such as a data storage system or array. In order to be able to rely on the information contained in these logs, a method must be available to check the log's integrity, such as ascertaining whether or not the log file has been tampered with. The motivation to tamper with a log can range from covering up mistakes, to hiding malicious acts. It may also be desirable, once the log content has been downloaded in textual form and stored off of the system, to be able to go back and verify the content of a particular log file at a later time.

Example embodiments described herein present techniques for providing mechanisms to leverage digital signatures, associated with each log entry, to verify the integrity of the content while it resides on the system, when being retrieved. This log content can then be downloaded, in textual form, and stored in an off-board repository. At a later time, this content can be used, via retrieval of a hash from the system, to verify the textual representation of the log based on, for example, the date range of the log entries. The techniques employed in the example embodiments help determine if a log file is associated with a particular data storage infrastructure, such as a data storage array or storage system ("storage array" and "storage system" may be used interchangeably herein), and if the log file has been tampered with.

Data Security has become one of the biggest challenges today particularly of securing the data at rest in the storage infrastructure and protecting against drive loss and theft. Data-at-rest encryption encrypts data stored on a drive using an encryption key. The encrypted data provides protection against drive theft; however, it does not protect against an intruder getting access to the encryption keys and using them to open a stolen drive. It also does not protect against a scenario where someone steals one or more drives (e.g., the first three drives) where a copy of the key resides along with other drives containing data a user wishes to protect. To prevent against such unauthorized access to data, a two-factor authentication system may be employed, such as those described in U.S. patent application Ser. No. 14/231,714 entitled ASSOCIATING ENCRYPTION CREDENTIALS WITH HARDWARE RESOURCES, filed Mar. 31, 2014, which is incorporated herein by reference for all purposes.

The first level of access control is enforced by capturing a system fingerprint at the time of the creation of the authentication key and using that with several randomly generated system stable values to associate with that encryption key. Any access to the key to decrypt the data must provide those system values. The hardware specific values may be generated on the fly to ensure that no tampering of the system has occurred. If more than one of the hardware values has changed then, the key stored in an encrypted store will not be accessible. This prevents a malicious user from removing one or more drives storing encryption data on one data storage array and installing them on another similar data storage array and gaining access to protected data. In addition, or alternatively, the second level of access control may be enforced by having the user or system administrator enter a passphrase to gain access to the data while trying to restore the key from an external source. If an incorrect passphrase is entered, then the data on the drives will not be accessible.

The best place to implement encryption in a computer system, especially a networked or enterprise computer system can vary depending on the use case and/or the customer. For example, in an enterprise-level computer system, encryption can be provided at the application level, the host or operating system level, within the network, and/or at the level where the physical device resides. For the purposes of discussion, the techniques described herein for verifying the integrity of system log files are described in conjunction with data at rest encryption at the hardware level using self-encrypting drives; however, this should be construed as a limitation, and the techniques may be applied to various different level in the software stack and/or different system or audit log files.

At the hardware level, self-encrypting drives are drives with circuitry built into a disk drive controller chip that encrypts and decrypts all data to and from the magnetic media on the fly. Self-encrypting drives encrypt all the time performing like any other hard drive with the encryption being completely transparent to the user. The contents of a self-encrypting drive, including the encryption keys stored thereon, always remain encrypted and are protected by hardware that cannot be accessed by other parts of the system. Because disk encryption is handled in the drive, overall system performance is not affected and is not subject to attacks targeting other components of the system.

FIG. 1 depicts an example embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of storage devices 17a-17n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX® data storage array by EMC Corporation of Hopkinton, Mass., including a plurality of data storage devices 17a-17n and two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX® data storage system mentioned above may include two storage processors 114A, 114B for performing processing in connection with servicing requests. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
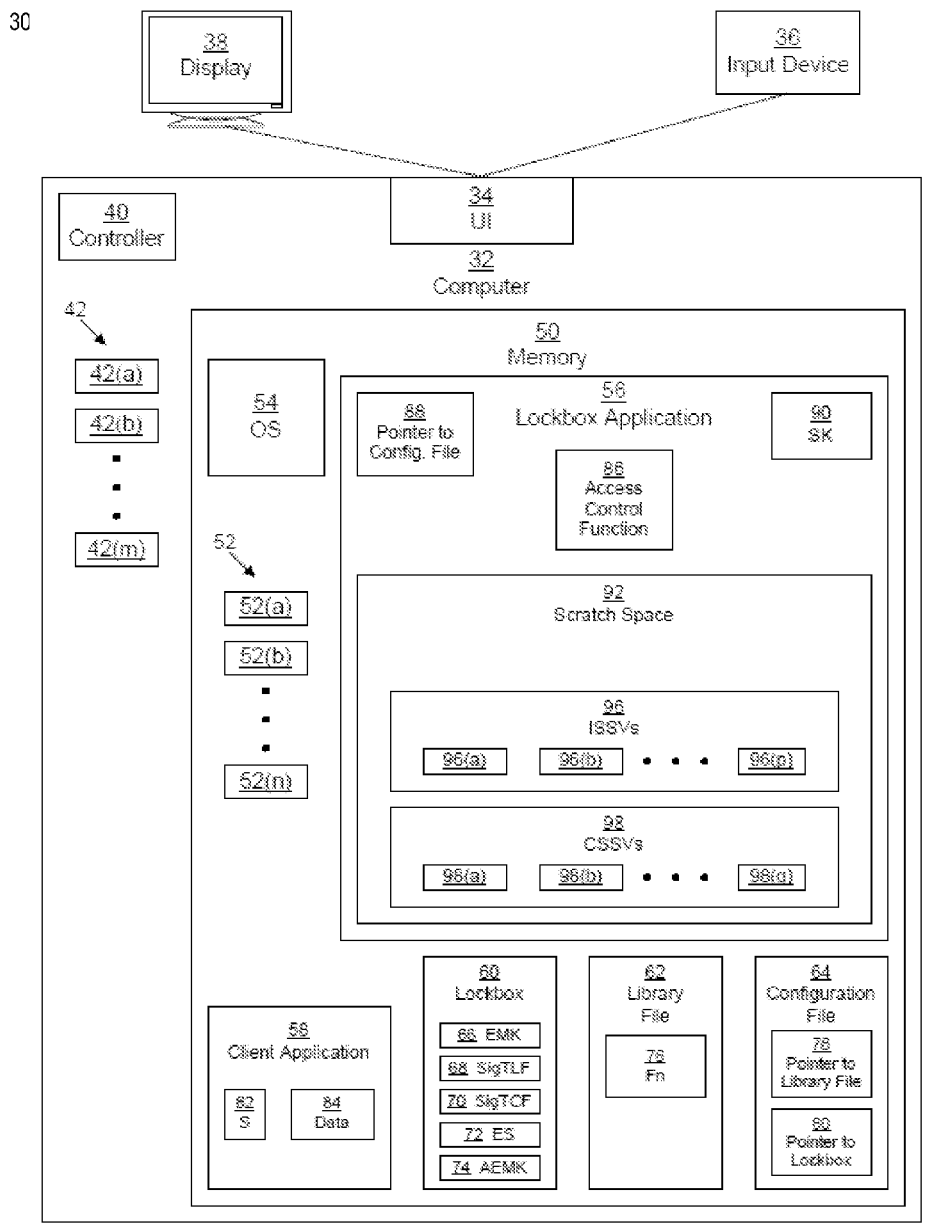
FIG. 2 is a diagram illustrating in more detail components of FIG. 1 that may utilize the techniques described herein.

FIG. 2 depicts a computer system 30 for use in practicing various embodiments. Computer system 30 includes a computer 32 having a user interface (UI) 34 connected to one or more input devices 36 (such as, for example, a mouse, keyboard, tracking pad, trackball, touch-screen, tablet, keypad, etc.) and an output device such as display 38 (such as, for example, a computer monitor or an embedded display screen). Computer 32 further includes a controller 40 (such as, for example, a general-purpose microprocessor, a processor, a central processing unit, dedicated circuitry, etc.), a set of stable hardware values 42 (including stable hardware values 42(*a*), 42(*b*), . . . , 42(*m*)) stored in memory 50. Memory 50 may include one or more of the following: random access memory (RAM), ROM, system memory, volatile memory, non-volatile memory, static RAM, flash memory, non-volatile data storage, optical storage, electromagnetic storage, floppy disk, hard disk, CD-ROM, DVD-ROM, Blu-ray, etc. Memory 50 stores, inter alia, a set of stable software values 52 (including stable software values 52(*a*), 52(*b*), . . . , 52(*n*)) (such as, for example, serial numbers of the operating system and various other pieces of installed software, parameters stored by the operating system and various other pieces of installed software, etc.), operating system (OS) 54, lockbox application 56, one or more client applications 58, lockbox file 60, library file 62, and configuration file 64.

Lockbox file 60 is a file that securely stores information on behalf of client applications 58, accessible through lockbox application 56. In some embodiments, lockbox file 60 stores data as a set of name-value pairs, the names representing the meaning of the contents of their respective values. The names may be encrypted for further security. The values are also encrypted, as described in further detail below. In some embodiments, lockbox file 60 may be stored in system memory (or another volatile and temporary storage medium), while in other embodiments, lockbox file 60 may be stored on a hard disk (or another permanent or semi-permanent non-volatile storage medium).

Library file 62 may be, for example, a dynamic-link library (DLL) that stores one or more functions callable by software applications. In particular, library file 62 stores a callback function (Fn) 76, which is operable to return the values of a pre-defined set of stable system values (SSVs) read from the computer 32, drawn from the set of stable hardware values 42 and the set of stable software values 52. This callback function 76 may be provided by the client application 58 to provide application-specific security. In some embodiments, library file 62 may store a plurality of callback functions 76, each one associated with a different client application 58. In other embodiments, multiple library files 62 may exist, each one storing a callback function 76 associated with a different client application 58.

Configuration file 64 is a file which stores various configuration data for the lockbox application 56. In one embodiment, configuration file 64 may be written in a markup language (such as, for example, the eXtensible Markup Language or XML). In particular, configuration file 64 may store a pointer 78 to the library file 62 (pointing either to a memory address or to a file path and name) as well as a pointer 80 to the lockbox file 60 (pointing either to a memory address or to a file path and name). In some embodiments, multiple lockbox files 60 are used, in association with multiple client applications 58, and a mapping between client applications 58 and pointers 80 to respective lockbox files 60 is stored as well. Configuration file 64 may also store function headers for functions stored in various library files 62, such as for callback function 76.

Client application 58 may be any application that can make use of securely stored data through lockbox application 56. For example, client application 58 may be an encrypted storage application. As an additional example, client application 58 may be a web browser that is configured to persistently and securely store user passwords for a variety of websites. Client application 58 manages a secret (S) 82. In one embodiment, secret 82 may be an application-specific encryption key for encrypting application-specific data 84 (for example, application-specific data 84 may be the contents of a storage device, or it may be user passwords for websites). In another embodiment, secret 82 may be the application-specific data 84 itself, the client application 58 relying on the lockbox 60 to securely store the application-specific data 84 rather than merely using the lockbox 60 to store the client-specific encryption key with which the client-application 58 encrypts the application-specific data 84.

Lockbox application 56 includes an access control function 86, a pointer 88 to configuration file 64 (pointing either to a memory address or to a file path and name), a secret key (SK) 90, and scratch space 92. In operation, computer system 30 may be initialized and configured to securely store secret 82 in lockbox file 60 as well as to securely access secret 82. Preliminarily, it should be noted that anytime a piece of software, such as lockbox application 56, is mentioned as performing an action, in fact, controller 40 actually performs the action while running the software.

In general, as part of an initialization process, lockbox application 56 (A) calculates and stores a signature 68 of a trusted library file 62 containing a trusted function 76 usable to generate stable system values (SSVs) of the computer, and (B) calculates and stores a first value based on an initial set of SSVs 96 generated by the trusted function 76, the first value and a second value to be used by an access control function 86 to enable access to a stored secret 82. In other embodiments, the first value may be any value generated from the initial set of SSVs 96.

As part of a use process, computer lockbox application 56 (A) calculates a signature SigLF of a loaded library file 62 containing an untrusted function 76 used to generate a current set of SSVs 98 upon which the second value is to be calculated, (B) compares the respective signatures of the trusted library file SigTLF 68 and the loaded library file SigLF to generate a comparison result signal, and (C) only when the comparison result signal indicates a successful comparison, permit an access-granting output of the access control function 86 to enable the access to the stored secret. In embodiments in which the first value is any value generated from the initial set of SSVs 96, the second value may be another value generated from the current set of SSVs 98 such that if the current set of SSVs 98 and the initial set of SSVs 96 are the same (or sufficiently close), lockbox application 56 is able to determine that the lockbox 60 may be opened.

Figure 3:
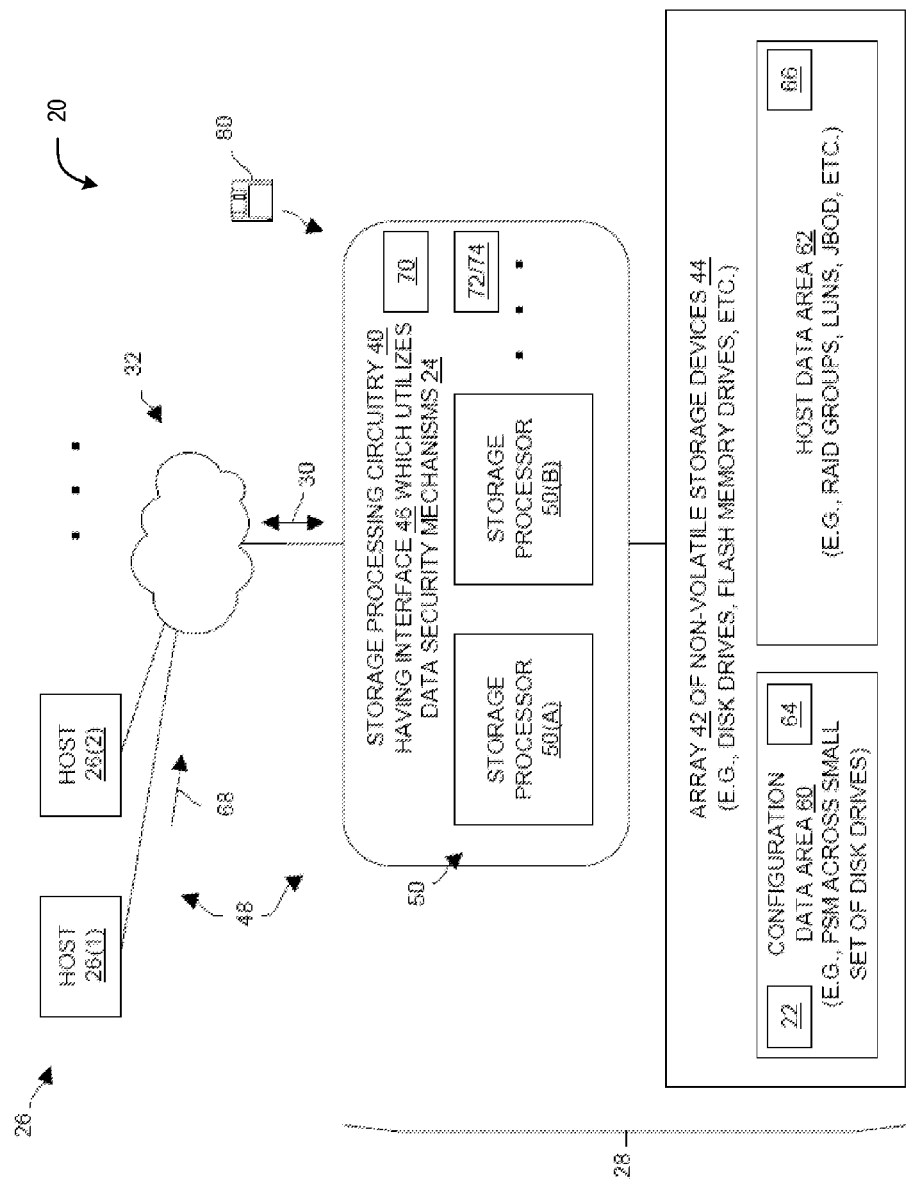
FIG. 3 is a diagram illustrating in more detail components of FIG. 1 that may utilize the techniques described herein.

FIG. 3 depicts a data storage system 20 which provides secure access to credentials 22 using data security mechanisms 24. The data storage system 20 includes a set of hosts 26(1), 26(2), . . . (collectively, hosts 26) and a data storage assembly 28. The hosts 26 communicate with the data storage assembly 28 by exchanging electronic signals 30 (e.g., fiber optic signals, electrical signals, wireless signals, combinations thereof, etc.) over a communications medium 32 (e.g., a storage fabric, a computerized network, combinations thereof, etc.) with connects the hosts 26 and the data storage assembly 28 together.

The data storage assembly 28 includes storage processing circuitry 40 and an array 42 of non-volatile storage devices 44. The storage processing circuitry 40 is constructed and arranged to provide an interface 46 which creates and utilizes the data security mechanisms 24 to secure and protect the credentials 22 on behalf of various applications 48 running within the system 20. In some arrangements, the storage processing circuitry 40 includes multiple storage processors 50(A), 50(B), . . . (collectively, storage processors 50). Each storage processor 50 is capable of being replaced during the lifetime of the data storage system 20.

The interface 46 initially creates and configures the data security mechanisms 24 to provide secure storage for the applications 48. This activity will be described in further detail shortly. Although an application 48 will typically access a respective data security mechanism 24, it is possible for multiple applications 48 to share access to a single data security mechanism 24. The applications 48 may run in the hosts 26, in the user space of the storage processors 50, or in both.

As further shown in FIG. 3, the array 42 of non-volatile storage devices 44 provides a configuration data area 60 and a host data area 62. The storage processing circuitry 40 writes system configuration data 64 into and reads system configuration data 64 from the configuration data area 60 when carrying out certain operations such as when making changes to the data storage system 20 and when reporting certain status to a user application. The configuration data 64 preferably includes, among other things, configuration information required for proper operation of the data storage system 20 (e.g., hostnames, LUN or volume information, username and password information, virtual machine configuration information, and so on). An example of the configuration data area 60 is storage allocated for a persistent storage manager module (PSM) of the data storage system 20.

Additionally, during array operation, the storage processing circuitry 40 writes host data 66 into and reads host data 66 from the host data area 62 on behalf of the hosts 26. Such operations occur in response to data storage requests 68 from the hosts 26.

It should be understood that both the configuration data area 60 and the host data area 62 are allocated storage areas which are preferably formed by multiple storage devices 44 (e.g., disk drives, flash memory drives, etc.) running a fault tolerant protocol. Along these lines, the storage devices 44 can be organized as just a bunch of disks (JBOD), volumes, LUNs, RAID groups (e.g., RAID 0, RAID 1, RAID 5, etc.), and so on which are capable of protecting data against various types of failures. For example, in some arrangements, the configuration data area 60 redundantly resides on a small set of disk drives (e.g., four disk drives running a RAID protocol) which are designated for holding PSM data. Similarly, other storage devices 44 can be grouped and arranged to effectively and efficiently hold the host data area 62. Each storage device 44 of the array 42 is capable of being replaced (e.g., hot swapped) during the lifetime of the data storage system 20.

As mentioned earlier, the interface 46 creates a data security mechanism 24 and then stores credentials 22 of an application 48 securely within the data security mechanism 24 on behalf of the application 48. To store the credentials 22 within the data security mechanism 24 and subsequently retrieve the credentials 22 from the data security mechanism 24, the interface 46 provides a set of standard library of routines, function calls, procedures, etc. which can be invoked by the application 48. In some implementations, the interface 46 provides an application programming interface (API) and the application 48 stores a credential 22 by passing it to the interface 46 which then, in combination with the data security mechanism 24, handles encryption/decryption, guarding of encryption keys, and direction of credential storage to the configuration data area 60 of the array 42 in a manner that is transparent to the application 48.

To initially create and configure the data security mechanism 24 to provide secure storage for an application 48, the interface 46 obtains a unique identifier 70 and a set of stable values 72. In some arrangements, the unique identifier 70 is a hostname of the particular host 26 running the application 48 when the hostname is unique to the data storage system 20. The hostname is obtainable from the configuration data area 60 which stores the configuration data of the data storage system 20. In some arrangements, the set of stable values 72 are machine-generated codes from a code generator 74 which are random to users of the system 20.

The set of stable values 72 is preferably generated by a code generator 74 of the storage processing circuitry 40 (e.g., a separate application/module running on the storage processing circuitry 40). In some arrangements, each stable value 72 is randomly generated and has a minimum length of 8 characters (64 bits) and a maximum length of 255 characters (2040 bits). In some arrangements, each stable value 72 contains at least one lower case character, one upper case character, one digit and one special character for added security.

Once the interface 46 receives the unique identifier 70 and the set of stable values 72, the interface 46 creates the data security mechanism 24 and configures the data security mechanism 24 to allow access to secure storage using a system fingerprint. The system fingerprint is based on both the unique identifier 70 and the set of stable values 72, e.g., a combination of the unique identifier 70 and the set of stable values 72.

It should be understood that the operations of (i) obtaining the unique identifier 70 and the set of stable values 72, (ii) creating the data security mechanism 24, and (iii) configuring the data security mechanism 24 to use the system fingerprint, are preferably performed in a manner which is transparent to the application 48. In particular, the interface 46 is able to acquire, as the unique identifier 70, the hostname of the host 26 running the application 48 from the configuration data stored in the configuration data area 30. Additionally, the interface 46 is able to acquire and save, as the set of stable values 72, machine-generated codes. The interface 46 is able to carry out these activities independently without assistance from the application 48.

Once the data security mechanism 24 is created and configured, the interface 46 is capable of receiving the credentials 22 from the application 48 and storing the credentials 22 in encrypted form as a set of files within the configuration data area 60 of the array 42. Accordingly, the credentials 22 enjoy the same safeguarding as other configuration data 64 of the system 20.

When the application 48 requires subsequent access to the credentials 22 (e.g., during a user login operation), the interface 46 obtains the unique identifier 70 and the set of stable values 72 in real time, and delivers this information to the data security mechanism 24. The data security mechanism 24 dynamically generates a current fingerprint and compares the current fingerprint to the earlier-created system fingerprint. Only if the current fingerprint matches the system fingerprint does the data security mechanism 24 decrypt the credentials 22 and provide the decrypted credentials 22 to the application 48 through the interface 46.

The interface 46 initially creates and configures a data security mechanism 24 for an application 48 and then operates as a conduit which enables that application 48 to subsequently access the credentials 22 stored within the data security mechanism 24 (e.g., the interface 46 provides wrapper and callback functions to the data security mechanism 24). To this end, the data security mechanism 24 includes an executable portion which runs within the storage processing circuitry 40 and a storage portion which resides within the configuration data area 60 (e.g., within the PSM). Once the data security mechanism 24 is created, the data security mechanism 24 uses keys for encryption and decryption. These keys are unique and random from a user's perspective and are automatically managed by the data security mechanism 24. It should be understood that the data security mechanism 24 may employ certain features from standard lockbox modules/files such as cryptographic keys, passwords, and configuration data as described elsewhere herein.

In some arrangements, the data security mechanism 24 further includes in-memory storage within the storage processing circuitry 40 (i.e., local semiconductor memory). In these arrangements, the credentials 22 always remain in encrypted form while the credentials 22 of the application 48 reside in the configuration data area 60. The credentials 22 are decrypted only after a copy of the credentials 22 is moved into the in-memory storage within the storage processing circuitry 40. Such operation by the interface 46 enables the reduction of frequent input/output (I/O) operations to the configuration data area 60 (i.e., a large number of reads of the configuration data area 60 in a short period of time) since access can be restricted at least temporarily to the local, in-memory copy of the credentials 22.

An example of an application 48 which benefits from the secure handling of credentials 22 in the manner described above is a service role tool application which provides a set of service accounts requiring user logins which use usernames and passwords. Another example of such an application 48 is a graphical user interface (GUI) (i.e., a system management application) which displays particular views of virtual machine information of the data storage system 20 such as information regarding ESX® servers offered by VMWare of Palo Alto, Calif. Other application examples include upgrade routines and procedures, new storage processor routines, and the like. For such applications 48, the interface 46 directs the data security mechanisms 24 to maintain their credentials 22 (e.g., usernames and passwords, virtual machine configuration information) in encrypted form within the configuration data area 60 of the array 42. As a result, the applications 60 are able to store their credentials 22 securely within the data security mechanisms 24 through the interface 46.

It should be understood that the set of stable values 72 is preferably stored in a secure and safe manner outside the data security mechanism 24. In some arrangements, the interface 46 stores the set of stable values 72 on behalf of the application 48 as configuration data 64 in the configuration data area 60 of the array 42 but separately from the data security mechanism 24. As a result, any part of the data storage system 20 can be lost and replaced with the exception of the configuration data area 60, and the application 48 will be able to maintain access to the credentials 22. For example, the hardware of the host 26 can be replaced with new hardware which is given the same hostname. As another example, the storage processing circuitry 40 can be replaced with new storage processing circuitry 40. Moreover, any of the storage devices 44 can be replaced (even one or more disks forming the configuration data area 60) as long as coherency of the configuration data area 60 is preserved. In all of these situations, the interface 46 is capable of dynamically generating a current fingerprint from the unique identifier 70 and the set of stable value 72, and then gaining access to the credentials 22 which are securely stored in the configuration data area 60.

It should be further understood that the interface 46 is capable of being delivered to and installed in the storage processing circuitry 40 from a computer program product 80 (illustrated generally by a diskette icon 80). Such a computer program product 80 includes a computer readable storage medium which stores instructions that are executed by the storage processing circuitry 40. Examples of suitable computer readable storage media include CD-ROM, flash memory, disk memory, tape memory, and so on.

However, the data Security provided by encryption is only as good as the generation, protection and management of the authentication key used to encrypt the DEK. The AK must be available when needed but at the same time access to the keys must be tightly controlled. The life cycle of the AK must be managed as the key is must be preserved for the life time of the data. Loss or corruption of the AK will lead to a DU/DL.

In order to protect and securely manage the lifecycle of the key encryption key the Data-at-Rest Encryption feature incorporates an Embedded Key Manager (EKM). The Key Manager is responsible for generation, secure storage, retrieval, backup and restore of the authentication key. The key lifecycle is self-managed and is not exposed to the user. The only user action permitted on the key is to backup it up and restore if needed. The encryption credentials are stored securely in an encrypted store in a triple mirrored partition and needs known values associated with the hardware at the time of the key creation to access the key. The key manager uses a mini-RAID engine to verify, rebuild and maintain consistency of the three copies. The key manager also handles drive errors and drive insertion or removal scenarios to rebuild the key for those drives. In addition to the triple mirror the key manager also stores the key on the SSDs residing on the two SPs. The key copies are sync'ed during every transition of the key state.

Figure 4:
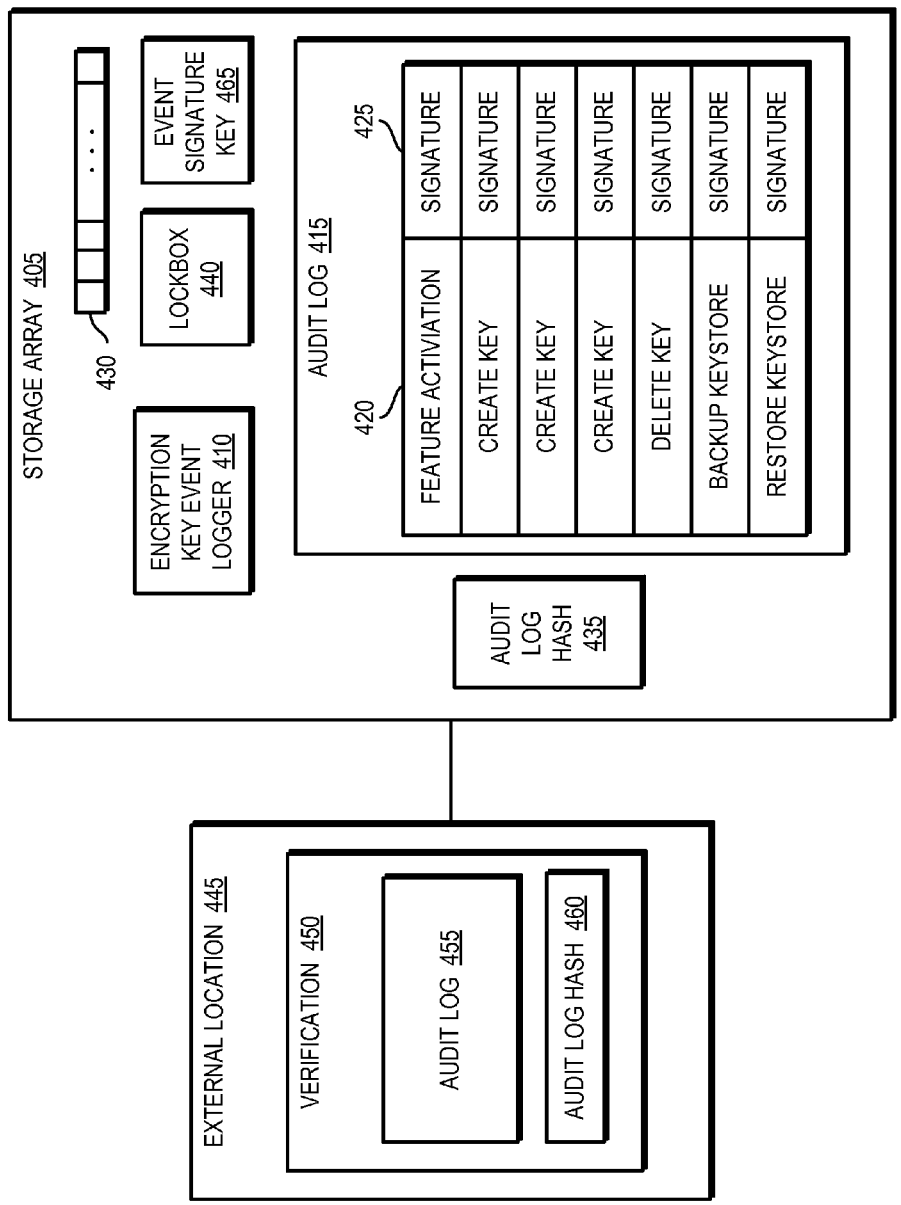
FIG. 4 is a diagram illustrating in more detail components of FIG. 1 that may utilize the techniques described herein.

FIG. 4 is a block diagram illustrating an example embodiment employing techniques described herein for verifying the integrity of an audit log arranged to store encryption key activity associated with self-encrypting drives. Although encryption key audit logs are used for discussion purposes, the techniques described herein should not be construed as being limited thereto and may be applied to other files where auditing and verification functionality is desired.

Drive and other encryption keys may be stored and managed by lockbox 440 in a manner similar as was described above. The storage array 405 may include an encryption key event logger 410 configured to identify and record encryption key activity events and the individual drive corresponding to the event. Encryption key activity events that may be recorded include events such as feature activation, key creation, key deletion, keystore backup, keystore restore operations and the like. An audit log 415 is created, maintained and stored on the storage array 405 and may be sufficiently sized such that it can hold a lifetimes worth of storage array key events. The audit log 415 may be arranged as, for example, a two-dimensional array where a first column includes entries for storing encryption key events 420 and a second column includes entries for storing unique signatures 425 associated with a corresponding encryption key event 420. Other arrangements, data structures and container type may be suitably employed.

In operation, when an encryption key event occurs, the event is identified by the encryption key event logger 410 and appended to the audit log 415 file by recording the event 420 as a new entry. An event signature 425 is created for each key event 420 by hashing the key event with a special event signature key 465 stored in the lockbox 440. The event signature key 465 may be obtained from the lockbox 440 using a secret such as an SSV 430 to gain access to the lockbox 440.

SSV values are chosen such that they uniquely identify the particular storage array on which they were generated. An SSV may include a number of different values associated with a particular storage array's hardware and software components.

Software SSVs may be derived using a random number generator or similar method such that unique values are derived. The software SSVs may be stored in a private space on the storage array's 405 system drives and may be encrypted or hashed as well. Alternatively, or in addition, a user may be allowed to select/provide one of the random software SSV values. In this case, a user could provide a password or other secret value that would be used as one of the software SSVs. This value could be required in addition to some minimum number of values for each subset of the hardware and software SSVs.

Hardware SSVs are values associated with particular hardware residing in the storage array capable of uniquely identifying the storage array 405. The particular hardware may be selected to include hardware based on the likelihood of it changing. Examples may include sub-systems, individual sub-system components, power supplies, and the like. Alternatively, or in addition, the values may be stored persistently in memory or may be derived on-the-fly by executing one or more systems commands to generate a set of SSV.

The software SSVs and the hardware SSVs may be combined to create a complete SSV 430. A complete SSV 430 includes a total number of values equal to the number of hardware SSVs and the number of software SSVs. The ratio of hardware to software SSVs is an implementation detail and need not be equal, that is, there may be more software SSVs than hardware SSVs, or more hardware SSVs than software SSVs, or an equal number (if an even number of total values is implemented). In one example embodiment, the techniques may provide for processing 10 total SSVs, comprising a subset of software and a subset of hardware values. For example, 4 hardware SSVs may be used and 6 software SSVs may be used.

As a result, the SSV 430 provides a verification mechanism traceable to a particular storage array 405 since the SSV 430 is derived from a unique combination of hardware and software components corresponding to that particular storage array 405. The SSV 430 is in turn used to open the lockbox 440 to obtain the event signature key 465. The event signature key 465 and key event contents are hashed to create the event signature 425. Thus, the SSV 430 provides the ability to verify that the key events 420 occurred on the storage array 405 from which the SSV 430 was created. In addition, the hash function enables detecting whether the key event entries 420 have been tampered with or otherwise modified. Such features provide the ability for a user to demonstrate that the key events recorded in the audit log 415 were generated on the storage array in question and that the key events have not been tampered with.

A hash may also be created for the audit log file 415 for verification and traceability functionality. For example, an audit log hash 435 may be created by hashing the contents of the audit log 415 (i.e., the key events and corresponding signatures). The audit log hash 435 can be for a subset of entries in the audit log file 415, such as a particular date range, or can be for the entire audit log file 415. Because the audit log hash 435 is based on the contents of the audit log 415 which is verifiable and traceable to a particular storage array, the audit log hash 435 is similarly verifiable and traceable to a particular storage array and whether it has been tampered with or not.

Verification of the audit log may be performed off-array at an external location 445. For example, a verification module 450 may be configured to retrieve a copy of the audit log 455 for verification. The external location 445, such as a management system 16 or other such system may be in communication with the storage array 405. The audit log 455 may be retrieve by, for example, executing a command via a GUI, command line interface (CLI), browser or the like. The audit log 455 may be simultaneously retrieved together with a copy of the audit log hash file 460.

Alternatively, or in addition, the audit log hash file 460 may be generated on-the-fly from the original audit log 415 by issuing a command directed to the storage array 405 instructing the storage array 405 to create an audit log hash 435 for a particular range of key events. The range can be, for example, a particular date range or can be the entire file. Such a feature may be useful when the copy of the audit log hash 460 located at the external location 445 by out of date with the audit log hash 435 stored on the storage array 405. This may occur in the case where the audit log hash 460 was created at a particular point in time. Subsequently, additional key events 420 are logged and appended to the storage array's 405 audit log file 415. Because the files are no longer identical, a hash of the storage array's 405 audit log 415 would be different that a hash of the external location's 445 audit log 455. To account for such situations, an audit log corresponding to the particular entries in the external location's 445 audit log 455 may be generated 'on-the-fly' by including a subset range (e.g., a date range) in the request directed to the storage array 405.

The audit log 455 may be verified by comparing the audit log hash 460 that accompanied the audit log 455 with the audit log hash received from the storage array 405 as a result of a request to regenerate an audit log hash for a particular range. A user may also rerun the hash function against the audit log 455 and compare it to the local audit log hash 460.

Thus, the user can verify that the audit log that was used to show the occurrence of a particular key event occurred on the storage array in question and that the audit log file has not been tampered with or otherwise modified or altered. For example, if a particular encrypted drive was removed from the storage array 415, some compliance policies or procedures require the missing drive's encryption key be deleted. Employing the techniques described herein, a user can demonstrate that the drive's associated encryption key was deleted by presenting and verifying the audit log to show a key deletion event for the particular drive occurred. Furthermore, such techniques prevent a user from modifying or fabricating made-up key event entries because each key event's corresponding signature in conjunction with the SSV and audit log hash can be used to verify the key event was generated on the storage array in question.

Figure 5:
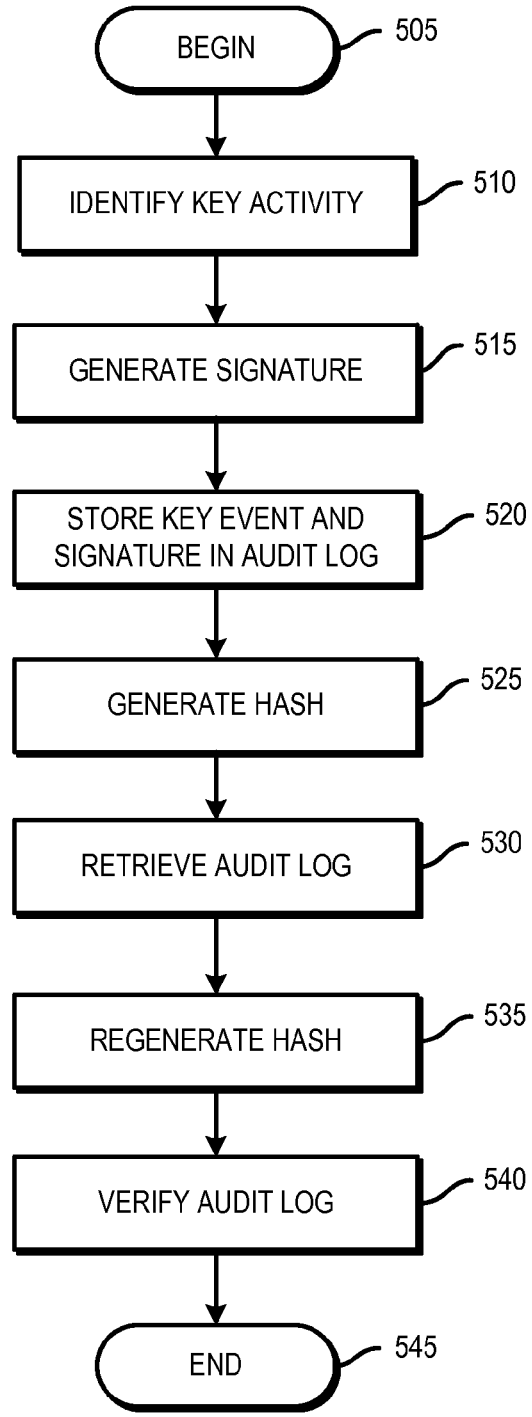
FIG. 5 is a flowchart of a method that may utilize the techniques described herein.

FIG. 5 is a flow diagram that illustrates an example method for use in implementing techniques described herein for verifying the integrity of a file, such as an audit file arranged to store encryption key activity events. Example embodiments may use an audit log for discussion purposes; however, this should not be construed as a limitation and alternative embodiments may be similarly implemented with other files for which verification is desired. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can begin at step 505. The method can be configured to run in attended mode and may be initiated manually by a user, for example, by clicking on a button or other object in a graphical user interface (GUI) associated with a management system or by entering a command in a command-line-interface, or as embedded in other software. Alternatively, or in addition, the method may run in unattended mode as part of system operating or application software or the like. Execution of the method can also be based on various user and/or system specified parameters.

At step 510, the method may identify and log encryption key activity events associated with, for example, encrypted drive key events such as key creation, key deletion, keystore backup, keystore restore and the like.

At step 515, a unique signature for each of the identified key activity event may be generated using an event signature key obtained from a lockbox. The lockbox may be accessed using an SSV unique to the storage array where the SSV is associated with a particular combination of hardware and software components.

At step 520, the encryption key activity events and their corresponding signatures may be recorded in an audit log file stored on the storage array and as new events are identified, they are appended to the file with a corresponding signature. The audit log file may be a plain text, human readable file.

At step 525, a hash function may be performed on the audit log for integrity purposes. For example a secure hash algorithm 256 (SHA-256) function may be run on the contents of audit log file (i.e., the key event and signature) to generate an audit log hash. Other cryptographic hash functions may be alternatively employed.

At step 530, the audit log may be retrieved from an external location for verification purposes, for example. Here, a user may initiate a command to retrieve the audit log file. The audit log hash may also be retrieved as part of the same command or separately. At step 535, a user may initiate a request directed to the storage array instructing the storage array to regenerate an audit log hash. The regenerate hash request may be for a subset of the key event entries stored in the audit log (e.g., for a particular date range) or may be for the entire contents of the current audit log file.

At step 540, the integrity of the retrieved audit log file may be verified. For example, a local audit log hash file may be generated using a hash function run on the retrieved audit log file. This local audit log hash may be compared to the retrieved audit log hash file to determine if the two files match. As a result, it can be determined if the retrieved audit log file has been tampered with. This verification process may be performed on an external workstation, host, management interface or the like and may, but need not, be part of an audit process to, for example, ensure compliance with various rules, requirements, policies, etc.

The integrity of the retrieved audit log hash may also be verified by regenerating a new audit log hash directly from the source audit file stored on the storage array. In one example embodiment, a regenerated audit log hash file may be retrieved from the storage array by issuing an instruction directing the storage system to regenerate an audit log hash file on-the-fly using the current audit log file contents. The instruction can request a hash for the entire file, or alternatively, can request a hash for a subsection of the audit file, such as a particular date range, number of entries, particular key events, etc. The retrieved regenerated audit log hash file may then be compared to the local audit log hash file (i.e., the audit log hash previously received along with the audit log request) and determine if the local audit log hash file matches the retrieved regenerated audit log hash file. An indicator may be generated so as to provide an indication as to whether or not the local audit log hash file matches the retrieved regenerated audit log hash file. The indicator may be an alert, GUI field, email, report, or other such notification and may be provided to a user and/or to storage array software or other management software. The method may end at step 545, or alternatively, may repeat beginning again at step 510.

Thus, the techniques described herein can be implemented to provide a mechanism to verify the integrity of an audit log file, an audit log hash file, and that one or both files are associated with a particular storage array.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The techniques described herein may take the form of a computer program product on a computer-usable storage medium having computer-usable program code embodied in the medium. Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), Flash memory, an optical fiber, a portable compact disc read-only memory (CD-ROM), an optical storage device, digital versatile disc ROM (DVD-ROM) a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The block diagrams and flowchart in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for verifying the integrity of an encryption key log file generated on a data storage system, the method comprising:
    identifying one or more encryption key activity events associated with back-end storage drives in a data storage system, wherein the back-end storage drives are system drives reserved for storing data associated with data storage system management activities and are not accessible for storing user data;
    generating, at the data storage system, a signature for each of the identified encryption key activity events, wherein the signature is uniquely specific to the data storage system;
    storing each encryption key activity event and its corresponding signature in an audit log file;
    generating, via a hash function, an audit log file hash file using the contents of the audit log file as an input for the hash function;
    retrieving, at a location external to the storage system, the audit log file and the audit log hash file from the data storage system; and
    verifying the integrity of the retrieved audit log file, wherein verifying includes generating a local audit log hash file based on a subset of entries and comparing the local audit log hash file to the retrieved audit log hash file wherein the number of entries in the retrieved audit log hash file corresponds to the number of entries used to create the local audit log hash file and determining if the local audit log hash file matches the retrieved audit log hash file.

2. The method of claim 1, wherein generating a unique signature for each of the identified encryption key activity events includes hashing the identified encryption key activity event with an event signature key.

3. The method of claim 2, wherein the event signature key is stored in a lockbox.

4. The method of claim 3, wherein the event signature key is retrieved from the lockbox using a system stable value (SSV) to gain access to the lockbox.

5. The method of claim 4 wherein the SSV is unique to the storage system.

6. The method of claim 5 wherein the SSV is derived from a plurality of hardware and software values unique to the data storage system.

7. The method of claim 1, further including verifying the integrity of the retrieved audit log hash file.

8. The method of claim 1, wherein verifying is performed at an external location as part of an audit procedure.

9. The method of claim 1, further including verifying the integrity of the retrieved audit log hash file, wherein verifying includes:
  retrieving a regenerated audit log hash file by issuing an instruction directing the storage system to regenerate an audit log hash file using the current audit log file contents;
  comparing the retrieved regenerated audit log hash file to the local audit log hash file and determining if the local audit log hash file matches the retrieved regenerated audit log hash file; and
  providing an indicator indicating whether or not the local audit log hash file matches the retrieved regenerated audit log hash file.

10. The method of claim 9, wherein retrieving a regenerated audit log hash file includes retrieving a regenerated audit log hash file based on a subset of contents of the audit log file stored on the storage system.

11. A system for verifying the integrity of an encryption key log file generated on a data storage system, the system comprising a special purpose storage processor configured to:
  identify one or more encryption key activity events associated with back-end storage drives in a data storage system, wherein the back-end storage drives are system drives reserved for storing data associated with data storage system management activities and are not accessible for storing user data;
  generate, at the data storage system, a signature for each of the identified encryption key activity events, wherein the signature is uniquely specific to the data storage system;
  generate, via a hash function, an audit log file hash file using the contents of the audit log file as an input for the hash function;
  retrieve, at a location external to the storage system, the audit log file and the audit log hash file from the data storage system; and
  verify the integrity of the retrieved audit log file, wherein verify includes generate a local audit log hash file based on a subset of entries and compare the local audit log hash file to the retrieved audit log hash file wherein the number of entries in the retrieve audit log hash file corresponds to the number of entries used to create the local audit log hash file and determine if the local audit log hash file matches the retrieved audit log hash file.

12. The system of claim 11, wherein generate a unique signature for each of the identified encryption key activity events includes hashing the identified encryption key activity event with an event signature key.

13. The system of claim 12, wherein the event signature key is stored in a lockbox.

14. The system of claim 13, wherein the event signature key is retrieved from the lockbox using a system stable value (SSV) to gain access to the lockbox.

15. The system of claim 14, wherein the SSV is unique to the storage system.

16. The system of claim 15, wherein the SSV is derived from a plurality of hardware and software values unique to the data storage system.

17. The system of claim 15, wherein the SSV is stored in persistent memory.

18. The system of claim 11, further configured to verify the integrity of the retrieved audit log hash file.

19. The system of claim 11, further configured to verify the integrity of the retrieved audit log hash file, wherein verify includes:
  retrieve a regenerated audit log hash file by issuing an instruction to direct the storage system to regenerate an audit log hash file using the current audit log file contents;
  compare the retrieved regenerated audit log hash file to the local audit log hash file and determine if the local audit log hash file matches the retrieved regenerated audit log hash file; and
  provide an indicator indicating whether or not the local audit log hash file matches the retrieved regenerated audit log hash file.

20. The system of claim 19, wherein retrieve a regenerated audit log hash file includes retrieve a regenerated audit log hash file based on a subset of contents of the audit log file stored on the storage system.

* * * * *